(12) United States Patent
Aida et al.

(10) Patent No.: US 10,300,817 B2
(45) Date of Patent: May 28, 2019

(54) SEAT-COVER OUTER-SKIN MATERIAL, SEAT COVER, AND VEHICLE SEAT

(71) Applicant: TACHI-S CO., LTD., Tokyo (JP)

(72) Inventors: Yusuke Aida, Tokyo (JP); Hiroshi Sekino, Tokyo (JP)

(73) Assignee: TACHI-S CO., LTD., Tokyo (JP)

( * ) Notice: Subject to any disclaimer, the term of this patent is extended or adjusted under 35 U.S.C. 154(b) by 0 days.

(21) Appl. No.: 15/548,586

(22) PCT Filed: Jan. 13, 2016

(86) PCT No.: PCT/JP2016/050871
§ 371 (c)(1),
(2) Date: Aug. 3, 2017

(87) PCT Pub. No.: WO2016/125549
PCT Pub. Date: Aug. 11, 2016

(65) Prior Publication Data
US 2018/0015859 A1 Jan. 18, 2018

(30) Foreign Application Priority Data
Feb. 3, 2015 (JP) ................. 2015-019328

(51) Int. Cl.
*A47C 31/02* (2006.01)
*A47C 7/24* (2006.01)
(Continued)

(52) U.S. Cl.
CPC ............ *B60N 2/5875* (2013.01); *A47C 31/02* (2013.01); *B60N 2/58* (2013.01); *B60N 2/5883* (2013.01); *B68G 13/02* (2013.01)

(58) Field of Classification Search
CPC ...... B60N 2/58; B60N 2/5883; B60N 2/5875; A47C 31/02; B68G 13/02
(Continued)

(56) References Cited

U.S. PATENT DOCUMENTS 4,679,851 A * 7/1987 Solie .................... A47C 31/026
297/218.2
4,772,070 A * 9/1988 Leto, Jr. .................. B60N 2/60
297/218.1
(Continued)

FOREIGN PATENT DOCUMENTS

| CN | 1551843 A | 12/2004 |
|---|---|---|
| CN | 101450785 A | 6/2009 |

(Continued)

OTHER PUBLICATIONS

International Search Report, dated Apr. 19, 2016, for International Application No. PCT/JP2016/050871, 5 pages. (with English Translation).
(Continued)

Primary Examiner — Rodney B White
(74) Attorney, Agent, or Firm — Seed IP Law Group LLP

(57) ABSTRACT

At least a part of a seat cover (4) covering a vehicle seat (1) is formed of a seat-cover skin material (5) including a surface material (10), a cushion material (11), and a backing material (12) which are laminated in this order and are integrally joined together, and a stitch portion (20) at which the surface material (10) and the backing material (12) are sewn together, wherein an elongation percentage of the surface material (10) is greater than an elongation percentage of the backing material (12) when the same load is applied.

9 Claims, 2 Drawing Sheets

(51) Int. Cl.
*B60N 2/58* (2006.01)
*B68G 13/02* (2006.01)

(58) Field of Classification Search
USPC .......... 297/218.1, 218.2, 218.3, 218.4, 218.5
See application file for complete search history.

(56) References Cited

U.S. PATENT DOCUMENTS

| | | | | |
|---|---|---|---|---|
| 5,501,165 | A * | 3/1996 | Nagashima | B60N 2/5891 297/218.1 X |
| 6,632,756 | B1 * | 10/2003 | Waldrop | B32B 5/18 297/218.1 X |
| 7,823,980 | B2 * | 11/2010 | Niwa | B60N 2/5891 297/218.2 |
| 8,783,768 | B2 * | 7/2014 | Severinski | B60N 2/5891 297/218.1 |
| 2009/0146483 | A1 | 6/2009 | Niwa et al. | |
| 2010/0043687 | A1 | 2/2010 | Evans et al. | |
| 2013/0057035 | A1 | 3/2013 | Nishiura et al. | |
| 2013/0127216 | A1 | 5/2013 | Nguyen et al. | |
| 2013/0140867 | A1 | 6/2013 | Posnien | |
| 2015/0266263 | A1 * | 9/2015 | Ichikawa | A47C 7/20 428/219 |

FOREIGN PATENT DOCUMENTS

| | | |
|---|---|---|
| CN | 103108775 A | 5/2013 |
| GB | 182172 A | 6/1922 |
| JP | 10-338097 A | 12/1998 |
| JP | 2013-162957 A | 8/2013 |

OTHER PUBLICATIONS

Extended European Search Report, dated Aug. 3, 2018, for European Application No. 16746380.1-1011, 6 pages.
Chinese Office Action, dated Aug. 31, 2018, for Chinese Application No. 201680008563.5, 12 pages (with machine generated English Abstract).

* cited by examiner

SEAT-COVER OUTER-SKIN MATERIAL, SEAT COVER, AND VEHICLE SEAT

TECHNICAL FIELD

The present invention relates to a seat-cover skin material, a seat cover, and a vehicle seat.

BACKGROUND ART

Typically, a vehicle seat includes a cushion pad which forms a seat outer shape, and a seat cover which covers the cushion pad. The seat cover is formed by a plurality of pieces formed of a seat-cover skin material sewn into a bag shape. From the viewpoint of the design of the seat, for example, in some cases, a stitch may be applied to the skin material of the piece corresponding to the seating surface of the seat (see, for example, Patent Document 1).

The seat-cover skin material described in Patent Document 1 is configured to include a surface material formed with a large number of ventilation through-holes, and the skin material is provided with stitches configured by a plurality of seams extending linearly in parallel to each other.

In the surface material, a large number of threading holes are formed at intervals along a line to be stitched, and the stitching thread on the front side passes through the threading hole and intersects with the stitching thread on the back side. As a result, meandering of the stitch seams, for example, sewing of the stitching thread on the front side into the ventilation through-hole is suppressed.

RELATED ART REFERENCE

Patent Document

Patent Document 1: JP-A-2013-162957

SUMMARY OF THE INVENTION

Problems to be Solved by the Invention

Irregularities can be formed on the surface of the skin material by stitching, and the irregularities on the surface of the skin material also contribute to the design of the seat. Further, in order to improve the design of the seat, it is required to deepen the depressions of the irregularities on the surface of the skin material to give a further three-dimensional feeling.

The present invention has been made in view of the above circumstances, and an object thereof is to provide a seat-cover skin material which can provide a further three-dimensional feeling by deepening the depressions of the surface irregularities formed by the stitching, and to enhance the design of a vehicle seat covered with a seat cover formed by using the seat-cover skin material.

Means for Solving the Problems

A seat-cover skin material of a first aspect of the present invention includes a surface material, a cushion material, and a backing material that are laminated in this order and are integrally joined together, and a stitch portion at which the surface material and the backing material are sewn together. An elongation percentage of the surface material is greater than an elongation percentage of the backing material when the same load is applied.

A seat cover of a second aspect of the invention is formed so as to at least partially include the seat-cover skin material.

A vehicle seat of a third aspect of the invention is covered with the seat cover.

Advantages of the Invention

According to the present invention, it is possible to provide a seat-cover skin material in which the depressions of the surface irregularities formed by the stitching can be deepened to provide a further three-dimensional feeling, and it is possible to enhance the design of the vehicle seat covered with the seat cover formed by using the seat-cover skin material.

MODES FOR CARRYING OUT THE INVENTION

Figure 1:
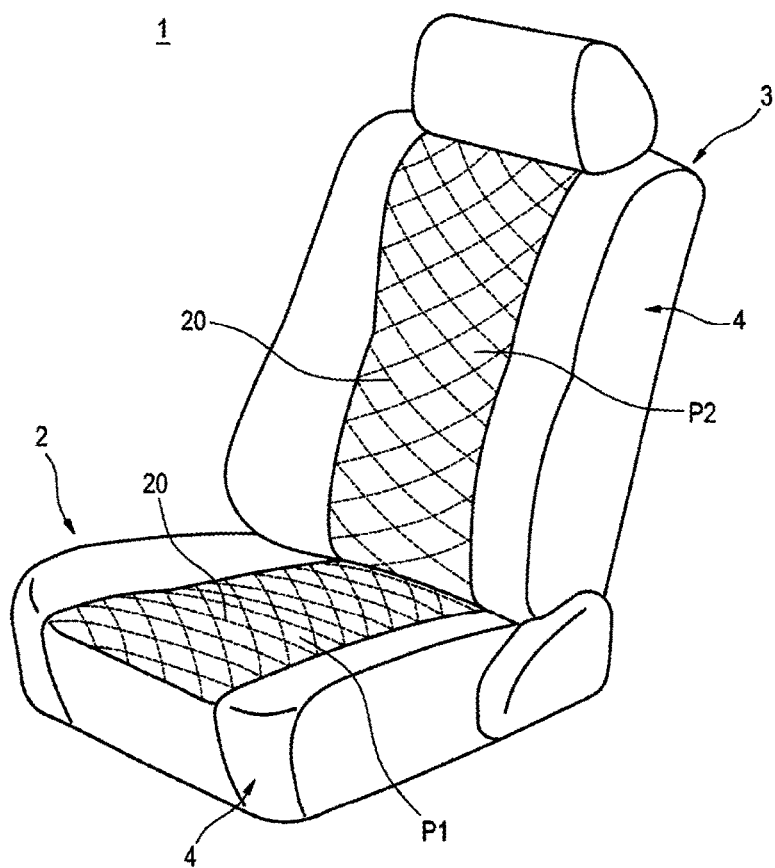
FIG. 1 is a diagram illustrating a configuration of an example of a vehicle seat for explaining an embodiment of the present invention.

FIG. 1 illustrates a configuration of an example of a vehicle seat for explaining an embodiment of the present invention.

A vehicle seat 1 illustrated in FIG. 1 includes a seat cushion 2 constituting a seating surface portion, and a seat back 3 constituting a backrest portion. The seat cushion 2 and the seat back 3 are constituted by covering a frame forming a framework and a cushion pad supported by the frame with a seat cover 4.

Each of the seat covers 4 of the seat cushion 2 and the seat back 3 is formed by sewing a plurality of pieces made of a skin material into a bag shape. Stitching is applied to a piece P1 constituting the seating surface among the plurality of pieces forming the seat cover 4 of the seat cushion 2, and a piece P2 constituting the backrest surface among the plurality of pieces forming the seat cover 4 of the seat back 3.

In the example illustrated in the drawing, a plurality of linearly extending seams (stitch portions) 20 intersecting in a mesh shape are applied to the pieces P1 and P2, but this is not a limitation. Further, the piece to be stitched is not limited to the piece constituting the seating surface or the backrest surface, and is appropriately selected from the pieces forming the seat cover 4 of each of the seat cushion 2 and the seat back 3.

Figure 2:
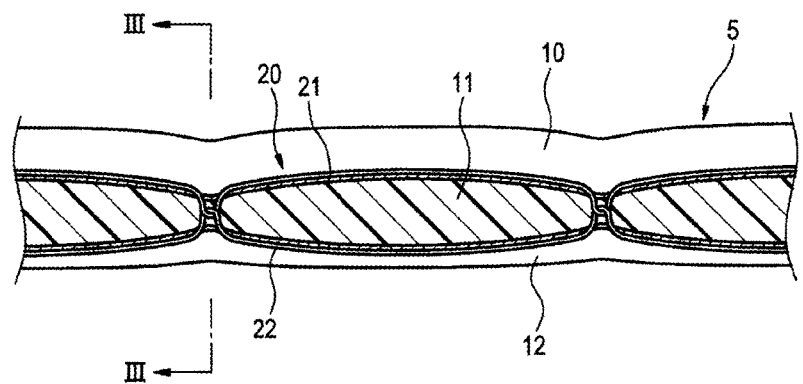
FIG. 2 is a view illustrating a configuration of a skin material of a seat cover of the vehicle seat of FIG. 1.
Figure 3:
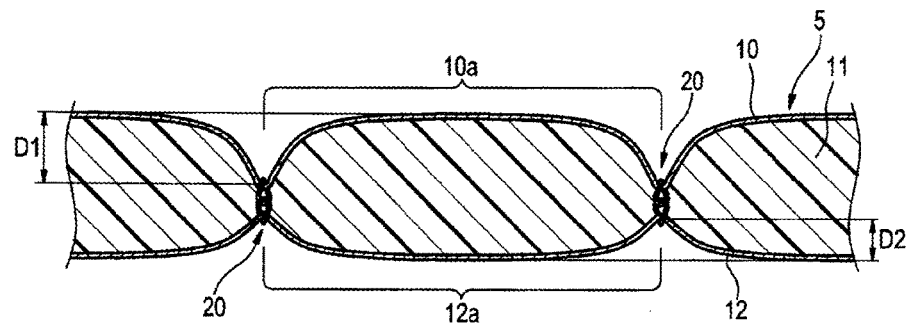
FIG. 3 is a view illustrating a cross section taken along line III-III in FIG. 2.

FIGS. 2 and 3 illustrate the configuration of the skin material forming the seat cover 4.

The skin material 5 totaling the pieces P1 and P2 to be stitched in the seat covers 4 of the seat cushion 2 and the seat back 3 is formed by laminating the surface material 10, the cushion material 11, and the backing material 12 in this order. The surface material 10 and the cushion material 11 are integrally joined in whole or in part by an appropriate method such as adhesion, and the cushion material 11 and the backing material 12 are also integrally joined in whole or in part.

For example, leather (natural leather, synthetic leather), cloth (woven fabric, knitted fabric, nonwoven fabric), and the like are used as the surface material 10. For example, resin foam such as elastically deformable flexible polyurethane foam is used as the cushion material 11. As the backing material 12, for example, cloth, leather, a resin sheet or the like is used. The surface material 10, the cushion material 11, and the backing material 12 may have a single layer structure or a multilayer structure.

The skin material 5 is provided with a stitch portion 20. In the stitch portion 20, a stitching yarn 21 on the front side and a stitching yarn 22 on the back side intersect with each other at an appropriate interval, and the surface material 10 and the backing material 12 are sewn together with the cushion material 11 interposed therebetween.

In the stitch portion 20, the surface material 10 and the backing material 12 are drawn into the cushion material 11 side, while compressing the cushion material 11 by the stitching yarns 21 and 22, respectively. As a result, irregularities in which the stitch portion 20 is recessed are formed on the front surface (surface on the side of the surface material 10) and the back surface (surface on the side of the backing material 12) of the skin material 5.

A depth D1 of the depression of the stitch portion 20 on the front surface of the skin material 5 is larger than a depth D2 of the depression of the stitch portion 20 on the back surface of the skin material 5 to make a relation of D1>D2. Thus, the elongation percentage of the surface material 10 is set to be greater than the elongation percentage of the backing material 12 when the same load is applied.

The elongation percentage of each of the surface material 10 and the backing material 12 can be set to the elongation percentage at the relatively small maximum load of a test piece, among the maximum loads of each of the test piece of the surface material 10 and the test piece of the backing material 12 obtained by the tensile test on the test piece of the surface material 10 and the test piece of the backing material 12.

The elongation percentage of each of the surface material 10 and the backing material 12 is set, for example, depending on the material, the thickness, and the like of each of the surface material 10 and the backing material 12.

Since the surface material 10 and the backing material 12 are integrally joined via the cushion material 11, even if stitched, there is no relative displacement in the plane direction, and the lengths of a section 10a of the surface material 10 and a section 12a of the backing material 12 sandwiched between the adjacent two stitch portions 20 before being stitched are equal to each other.

The repulsive force of the cushion material 11 compressed by stitching acts uniformly on the surface material 10 and the backing material 12. If the elongation percentage of the surface material 10 and the elongation percentage of the backing material 12 are the same, the surface material 10 and the backing material 12 are drawn equally into the cushion material 11 side.

On the other hand, when the elongation percentage of the surface material 10 is greater than the elongation percentage of the backing material 12, the section 10a of the surface material 10 becomes relatively longer due to the elongation caused by the repulsive force of the cushion material 11. Since the interval between the two adjacent stitch portions 20 is common to the section 10a of the surface material 10 and the section 12a of the backing material 12, the surface material 10 having a relatively long length of one section is deeply drawn into the cushion material 11 side as compared to the backing material 12. As a result, the depth D1 of the depression of the stitch portion 20 on the front surface of the skin material 5 becomes larger than the depth D2 of the depression of the stitch portion 20 on the back surface of the skin material 5.

In this way, the elongation percentage of the surface material 10 is set to be greater than the elongation percentage of the backing material 12, and by setting the depth D1 of the depression of the stitch portion 20 on the front surface of the skin material 5 to be larger than the depth D2 of the depression of the stitch portion 20 on the back surface of the skin material 5, it is possible to deepen the depression of the irregularities on the front surface of the skin material 5 without largely changing the thickness of the skin material 5, thereby giving a further three-dimensional feeling. Further, it is possible to enhance the design of the vehicle seat 1 to be covered with the seat cover 4 formed by using the skin material 5.

Although it is possible to make the depressions of the irregularities of the front surface of the skin material 5 deep by thickening the cushion material 11, in this case, since the sinking of the cushion material 11 when the occupant is seated becomes excessive, there is a risk that the comfort of sitting will be impaired.

In addition, it is preferable that the surface material 10 has flexibility higher than the flexibility of the backing material 12. According to this, the surface material 10 is drawn deeper into the cushion material 11 side than the backing material 12, so that the depression of the irregularities on the front surface of the skin material 5 can be deepened to give a further three-dimensional feeling. Further, since the surface material 10 has high flexibility, the drawing of the surface material 10 to the cushion material 11 side becomes steeper, and it is possible to give a further three-dimensional feeling to the irregularities on the front surface of the skin material 5.

Hereinafter, a preparation example of the skin material 5 will be described.

Preparation Example 1

In the skin material of Preparation Example 1, natural leather having a thickness of 2 mm as the surface material 10, a flexible urethane foam having a thickness of 15 mm as the cushion material 11, and thin nylon half (thickness of approximately several hundreds μm) as the backing material 12 were laminated in this order and joined together. The nylon half is generally rich in elasticity and the elongation percentage of the nylon half used as the backing material 12 is greater than the elongation percentage of the natural leather used as the surface material 10 when the same load is applied.

Preparation Example 2

The skin material of Preparation Example 2 was configured in the same manner as the skin material of Preparation Example 1, except that thin cheesecloth (thickness of approximately several hundreds μm) was used as the backing material 12. The elongation percentage of the natural leather used as the surface material 10 at the maximum load of the test piece of the cheesecloth was 15.2% with respect to the elongation percentage of the test piece of the cheesecloth used as the backing material 12 of 13.3%. That is, the elongation percentage of the natural leather used as the surface material 10 at the elongation percentage at the same load is greater than the elongation percentage of the cheesecloth used as the backing material 12.

A stitch was applied to the skin material of Preparation Example 1 and the skin material of Preparation Example 2 using the same sewing machine, and the depth D1 of the depression of the stitch portion 20 on the front surface of each of the skin material of Preparation Example 1 and the skin material of Preparation Example 2 was measured. As a result, D1 was about 5 mm in the skin material of Preparation Example 1 in which the elongation percentage of the surface material 10 was smaller than the elongation percentage of the backing material 12, and was about 30% of the entire thickness (about 17 mm) of the skin material. In contrast, D1 was about 7 mm and about 40% of the entire thickness of the skin material (about 17 mm) in the skin material of Preparation Example 2 in which the elongation percentage of the surface material 10 was greater than the elongation percentage of the backing material 12.

By making the elongation percentage of the surface, material 10 greater than the elongation percentage of the backing material 12 from the above preparation example, it was checked that the depressions of the irregularities on the front surface of the skin material 5 can be deepened without largely changing the thickness of the skin material 5. It can be said that it is preferable that the elongation percentage of the surface material 10 be greater than the elongation percentage of the backing material 12 by 1% or more.

The above-described configuration of the seat-cover skin material 5, the seat cover 4, and the vehicle seat 1 is an example, and appropriate modifications and changes can be made without departing from the spirit of the present invention.

As described above, the seat-cover skin material disclosed in the present specification is formed such that a surface material, a cushion material, and a backing material are laminated in this order and integrally joined together, and has a stitch portion at which the surface material and the backing material are sewn together. The elongation percentage of the surface material is greater than the elongation percentage of the backing material when the same load is applied.

In addition, the seat-cover skin material disclosed in this specification has higher flexibility of the surface material than the flexibility of the backing material.

In addition, the seat cover disclosed in the present specification is formed so as to at least partially include the seat-cover skin material.

Also, the vehicle seat disclosed in this specification is covered with the seat cover.

INDUSTRIAL APPLICABILITY

The seat-cover skin material of the first aspect of the present invention and the seat cover formed by including at least partially the seat-cover skin material are not limited to a vehicle seat mounted on a vehicle such as an automobile, and can also be applied to other sheets such as an office chair.

This application is based on Japanese Patent Application (Japanese Patent Application No. 2015-019328) filed on Feb. 3, 2015, the contents of which are incorporated herein by reference.

DESCRIPTION OF REFERENCE NUMERALS AND SIGNS

1 Vehicle seat
2 Seat cushion
3 Seat back
4 Seat cover
5 Skin material
10 Surface material
11 Cushion material
12 Backing material
20 Stitch portion

The invention claimed is:

1. A seat-cover skin material comprising:
a surface material;
a cushion material;
a backing material, the backing material being a thin cheesecloth; and
a stitch portion at which the surface material and the backing material are sewn together, wherein:
the surface material, the cushion material and the backing material are laminated in this order and are integrally joined together; and
an elongation rate of the surface material is greater than an elongation percentage of the backing material when the same load is applied.

2. The seat-cover skin material according to claim 1, wherein a thickness of the cheesecloth is equal to or less than several hundred μm.

3. A seat cover comprising: a seat-cover skin material including:
a surface material;
a cushion material;
a backing material, the backing material being a thin cheesecloth; and
a stitch portion at which the surface material and the backing material are sewn together, wherein:
the surface material, the cushion material and the backing material are laminated in this order and are integrally joined together; and
an elongation rate of the surface material is greater than an elongation percentage of the backing material when the same load is applied.

4. The seat cover according to claim 3, wherein a thickness of the cheesecloth is equal to or less than several hundred μm.

5. A vehicle seat covered with a seat cover, at least a part of the seat cover comprising:
a seat-cover skin material including:
a surface material;
a cushion material;
a backing material, the backing material being a thin cheesecloth; and
a stitch portion at which the surface material and the backing material are sewn together, wherein
the surface material, the cushion material and the backing material are laminated in this order and are integrally joined together; and
an elongation rate of the surface material is greater than an elongation percentage of the backing material when the same load is applied.

6. The seat according to claim 5, wherein a thickness of the cheesecloth is equal to or less than several hundred μm.

7. A seat-cover skin material comprising:
a surface material;
a cushion material;
a backing material; and
a stitch portion at which the surface material and the backing material are sewn together, wherein:
the surface material, the cushion material and the backing material are laminated in this order and are integrally joined together;
an elongation rate of the surface material is greater than an elongation percentage of the backing material when the same load is applied; and a depth of a depression of the stitch portion on a front surface of the skin material is larger than a depth of a depression of the stitch portion on a back surface of the skin material.

8. A seat cover comprising:
a seat-cover skin material including:
a surface material;
a cushion material;
a backing material; and
a stitch portion at which the surface material and the backing material are sewn together, wherein:
the surface material, the cushion material and the backing material are laminated in this order and are integrally joined together;
an elongation rate of the surface material is greater than an elongation percentage of the backing material when the same load is applied; and
a depth of a depression of the stitch portion on a front surface of the skin material is larger than a depth of a depression of the stitch portion on a back surface of the skin material.

9. A vehicle seat covered with a seat cover, at least a part of the seat cover comprising:
a seat-cover skin material including:
a surface material;
a cushion material;
a backing material; and
a stitch portion at which the surface material and the backing material are sewn together, wherein:
the surface material, the cushion material and the backing material are laminated in this order and are integrally joined together;
an elongation rate of the surface material is greater than an elongation percentage of the backing material when the same load is applied; and
a depth of a depression of the stitch portion on a front surface of the skin material is larger than a depth of a depression of the stitch portion on a back surface of the skin material.

* * * * *